LOGIC ARRANGEMENT EMPLOYING LIGHT GENERATING DIODES, PHOTSENSITIVE DIODES AND REFLECTING GRATING MEANS

Filed Sept. 20, 1965 2 Sheets-Sheet 1

INVENTOR
E. H. COOKE-YARBOROUGH
BY Lucian C. Canepa
ATTORNEY

REFLECTING GRATING 31

United States Patent Office 3,401,266
Patented Sept. 10, 1968

3,401,266

LOGIC ARRANGEMENT EMPLOYING LIGHT GENERATING DIODES, PHOTOSENSITIVE DIODES AND REFLECTING GRATING MEANS

Edmund H. Cooke-Yarborough, Murray Hill, N.J., assignor to Bell Telephone Laboratories, Incorporated, New York, N.Y., a corporation of New York Filed Sept. 20, 1965, Ser. No. 488,630
21 Claims. (Cl. 250—209)

This invention relates to data processing circuits and, more specifically, to a logic generating arrangement which employs optical coupling.

The electronics art is replete with system applications which require one or more logic circuits for generating Boolean functions of a plurality of binary input variables. Such systems employ logic structures ranging from simple organizations of only a few stages, to very intricate and elaborate switching units embodying bays of equipment.

As such logic arrangements become relatively large, problems arise with respect to fabricating the wire interconnections between the inputs and outputs of associated stages. First, since such interconnections are usually made by hand, human error results in misconnections or omitted connections, with the probability of error being directly related to circuit complexity. Then also, the relatively large signals required on these interstage links for threshold discrimination purposes result in a power dissipation problem which must be vitiated. Finally, a relatively large number of interconnecting wires cannot generally be contained in a planar structure. Accordingly, the resulting crossed wires give rise to insulation and signal induction considerations which must be taken into account.

It is therefore an object of the present invention to provide an improved logic generating structure.

More specifically, an object of the present invention is the provision of a Boolean logic function generator embodying interstage coupling which may be relatively simply and inexpensively fabricated.

It is another object of the present invention to provide a logic arrangement which operates at a relatively rapid rate of speed.

It is still another object of the present invention to provide a logic generating arrangement whose characteristic Boolean output functions may be changed in a relatively simple manner without the necessity for any wiring modifications.

These and other objects of the present invention are realized in a specific illustrative Boolean logic function generator of arbitrary complexity which employs optical coupling between stages. The generator embodies plural NOR logic stages each comprising an input photo-detecting diode and an output electro-luminescent diode connected to a common current source. The detecting diode is responsive to an incoming light beam for interrupting an output beam normally supplied by the output diode. Interstage fan-out and fan-in is accomplished by a set of reflecting optical gratings which selectively direct the output beam generated by each stage to the desired following logic stages.

It is thus a feature of the present invention that a logic arrangement employ light beams to effect interstage fan-in and fan-out.

More specifically, it is a feature of the present invention that a logic arrangement include reflecting gratings to optically interconnect associated logic stages.

It is another feature of the present invention that a logic function generator include at least one optical reflecting grating, a photo-detecting diode, an electro-luminescent diode which selectively illuminates the grating(s), and a current source connected to the detecting diode and to the electro-luminescent diode.

A complete understanding of the present invention and of the above and other features, advantages and variations thereof may be gained from a consideration of the following detailed description of an illustrative embodiment thereof presented hereinbelow in conjunction with the accompanying drawing, in which:

FIG. 1 comprises a schematic diagram of an illustrative NOR logic stage which partially embodies the principles of the present invention;

Figure 1:
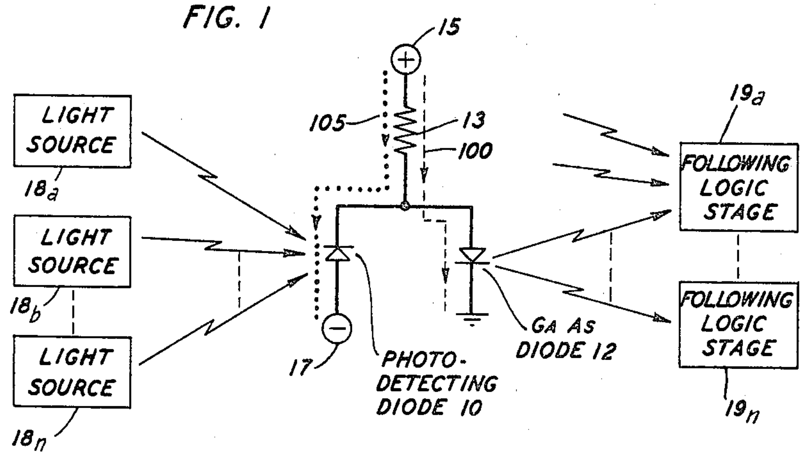

Turning now to FIG. 1, there is shown in schematic form a NOR logic stage which comprises the basic building block for the instant logic generating arrangement. As is well known, a NOR logic gate is universal in the sense that any Boolean logic function of arbitrary complexity may be fabricated from a proper interconnection of a plurality of such gates. In this regard see, for example, page 53 et seq. of a text by M. Phister, Jr. entitled "Logical Design of Digital Computors," published in 1959 by John Wiley & Sons, Inc.

The logic stage of FIG. 1 includes a photo-detecting input diode 10 and an oppositely poled electro-luminescent output diode 12 which are connected to a common current source comprising a resistor 13 and a voltage source 15. The photo-detecting input diode 10, which may advantageously employ avalanche multiplication, is a well known device, and is characterized by the ability to conduct current in the backward, or reverse-bias direction when exposed to illumination. Correspondingly, the electro-luminescent output diode 12, which may advantageously comprise a well known galium arsenide device, is adapted to emit a characteristic, essentially monochromatic optical beam when an electronic current is passed therethrough.

A negative voltage source 17 and ground potential are respectively applied to the other terminals of the input and output diodes 10 and 12. Further, a plurality of input light sources $\mathbf{18_a}$ through $\mathbf{18_n}$ are adapted to selectively transmit light beams to the photo-detecting diode 10, while the output diode 12 is operative to selectively supply light beams to a plurality of following logic stages $\mathbf{19_a}$ through $\mathbf{19_n}$, and more particularly to the photo-detecting input diodes included therein. It is observed that the sources 18 might well comprise the electro-luminescent output diodes included in preceding logic stages. Hence, the sources 18 and the stages 19 respectively represent the fan-in and fan-out of digital logic information to and from the logic stage of FIG. 1.

When none of the light sources 18 is energized, the photo-diode 10 is reverse biased by the sources 15 and 17, and is therefore nonconductive. Accordingly a current, shown in FIG. 1 by the dashed vector 100, emanates from the source 15 and flows through the resistor 13 and the output diode 12. Under these conditions, the electro-luminescent diode 12 emits a monochromatic light beam which translates to the following logic stages 19.

When any one of the input sources 18 illuminates the input photo-detecting diode 10, the device 10 is rendered conductive in its reverse-bias direction. Accordingly, the photo-diode 10 is operative to impress the negative potential characterizing the voltage source 17 on the anode of the output diode 12, hence rendering the device 12 nonconductive. With the above conditions prevailing, current is diverted from the output diode 12, and flows from the source 15 to the source 17 through a path indicated by the dotted vector 105 shown in FIG. 1. Hence the non-conducting output diode 12 ceases to emit an output light beam when the input diode 10 is illuminated.

The FIG. 1 logic stage has therefore been shown by the above to effect conventional NOR logic. More specifically, an output beam is generated by the electro-luminescent output diode 12 only when an input light beam is *not* generated by the source $18_a$ *or* the source $18_b$ *or* . . . the source $18_n$.

Figure 2:
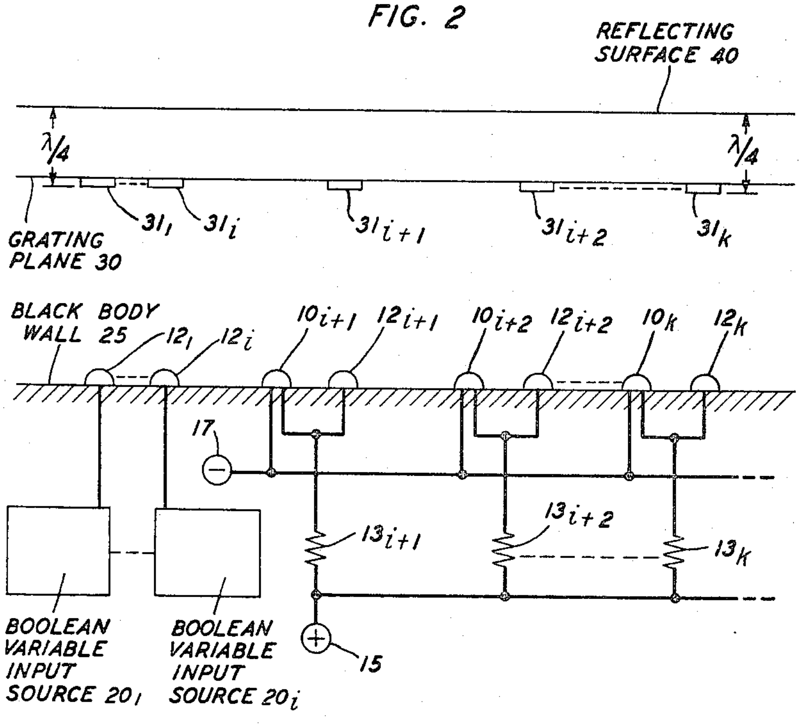
FIG. 2 is a top view of a composite logic organization made in accordance with the principles of the present invention.

Turning now to FIG. 2, there is shown in top view a plural stage logic function generator. The arrangement includes a black body, light absorbing wall 25 which has mounted thereon a plurality of electro-luminescent diodes $12_1$ through $12_i$, with a plurality of Boolean variable input current sources $20_1$ through $20_i$ being respectively connected thereto. These diodes 12 respond to current signals supplied thereto by the respective sources 20 by selectively injecting input light beams into the FIG. 2 arrangement. It is noted that the relative presence or absence of these beams embodies the binary state of a corresponding plurality of Boolean variables, and therefore comprises the input information upon which the composite FIG. 2 logic function generating arrangement operates.

Also mounted on the black body wall 25 are a plurality of logic stages, comprising associated components designated by like subscripts running from $i+1$ to $k$, each of which identically corresponds to the logic stage organization shown in FIG. 1, with the sources 15 and 17 being common to all stages. Since the wall 25 is in fact two-dimensional, the array of logic stages mounted thereon may advantageously embody any two-dimensional pattern, for example a rectangular or cylindrical coordinate axis relationship. For purposes of clarity, only one row of logic stages is shown in FIG. 2.

The photo-detecting diodes 10 and the electro-luminescent output diodes 12 are each optically oriented to face a transparent grating plane 30 which includes thereon a plurality of reflecting grating organizations 31. More specifically, one grating structure 31 directly faces each beam generating diode 12, and comprises a number of sections in one-to-one correspondence with the fan-out desired for the corresponding device 12. Further, a reflecting surface 40 is included in the FIG. 2 arrangement, and physically located a distance corresponding to one quarter of the diode 12 characteristic wavelength from the front of the gratings 31.

Figure 3:
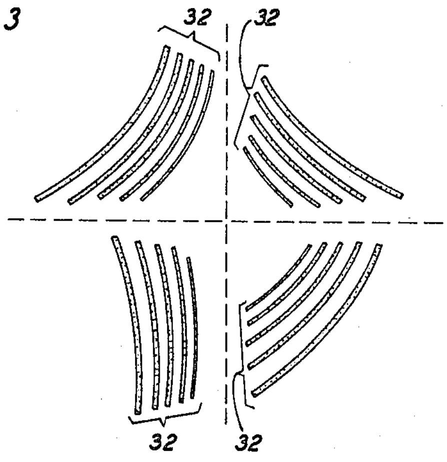
FIG. 3 illustrates in detail a reflecting grating structure 31 employed in the arrangement shown in FIG. 2.

A typical grating for a fan-out of 4 is shown in FIG. 3 and is physically oriented such that the associated light beam producing diode 12 directly faces the center of the grating 31, i.e., the intersection of the dashed grating axes shown in FIG. 3. Each section, or quadrant of the grating 31 comprises a transparent background upon which is mounted a series of approximately parallel reflecting surfaces 32 which are operative, in conjunction with the reflecting surface 40, to direct and focus the incident portion of each output light beam to the input photo-diode 10 included in a particular following logic stage.

Figure 4:
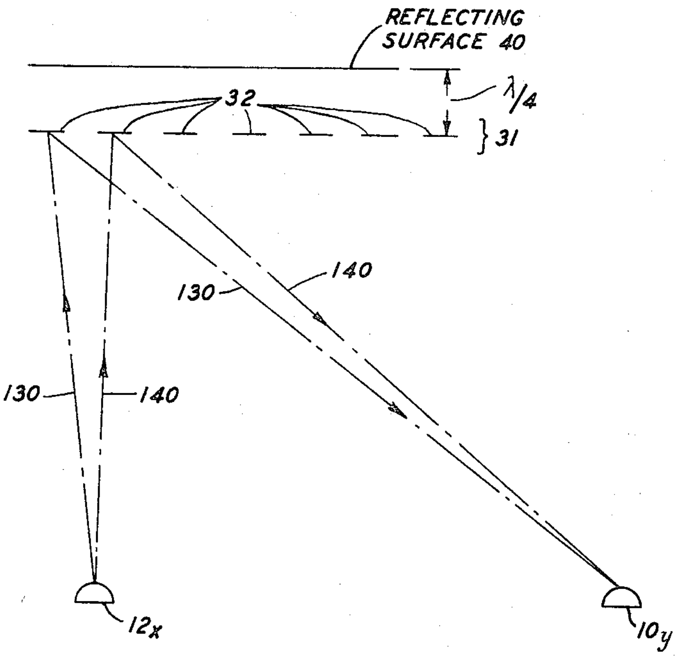
FIG. 4 depicts the optical coupling relationship between two associated logic stages included in the FIG. 2 logic organization.

The relationship between a logic stage output diode $12_x$, an input photo-diode $10_y$ included in an arbitrary following logic stage, and the configuration of a corresponding reflecting grating section is shown in FIG. 4. The grating reflecting elements 32 are spaced in a non-linear manner such that the total distances from the output diode $12_x$ to the input diode $10_y$ via adjacent elements 32, e.g., the distances characterizing the paths 130 and 140 shown in FIG. 4, differ by an integral number of wavelengths, and preferably by one wavelength. Moreover, the shapes of the individual elements 32 are curved, as shown in FIG. 3, such that the total light path length is the same for a signal reflected by any portion of an element 32.

It is apparent from the above that the light translated to the input diode $10_y$ by the individual reflecting elements 32 arrives in a like phase relationship, and is therefore mutually re-enforcing. Accordingly, the grating reflecting elements 32 included in a particular section of a grating 31 are operative to reflect, direct and focus the incident light emanating from the output diode $12_x$ to the desired next stage input diode $10_y$. As indicated above, fan-out is accomplished by employing plural sections in a composite grating 31, with each section being operative to translate a portion of the incoming light to a different input photo-diode 10.

The reflecting gratings 31 have therefore been shown by the above to effect any desired interstage coupling between associated logic stages included in the FIG. 2 arrangement. The specific grating pattern will, of course, depend upon the particular Boolean function to be generated. Moreover, this overall logic function can be totally altered by simply changing the grating plane 30, and thereby also the gratings 31, without the necessity for any wiring modifications.

It is noted that output information may be derived from the FIG. 2 arrangement in several ways. First, the common junction of the diodes 10 and 12 included in selected logic stages may be electrically monitored. A small positive voltage or a relatively large negative voltage will be respectively detected thereat in the absence or presence of incoming light transmitted to the stage. Alternatively, additional photo-detecting diodes 10 may be mounted on the black body wall 25 and used for information outputting purposes.

The functional operation of the reflecting surface 40 will now be considered. Absent the surface 40, the FIG. 2 arrangement will operate as indicated hereinabove, with a considerable portion of the light generated by an electro-luminescent diode 12 being lost when it is directed by the associated grating surfaces 32 in an additive phase relationship back towards the diode 12. However, the surface 40 is operative to direct incident light which passes between the grating elements 32 back to the beam originating diode 12 in 180 degree phase opposition to the light reflected thereto by the grating elements 32. This occurs since light reflected by the surface 40 to the generating diode 12 must travel the one-quarter wavelength distance between the grating 31 and the surface 40 two times, or one-half a wavelength (equivalent to 180 degrees). Accordingly, the surface 40 inhibits light from being lost as a direct reflection by the grating elements 32 back to the generating diode 12.

To the contrary, the surface 40 is operative to increase by a multiple of four the light intensity of the beam which the reflecting elements 32 direct towards a receiving input photo-diode 10 by beneficially employing light otherwise lost as it passes between adjacent elements 32. This follows from the extra one-half wavelength all light passing between two elements 32 must travel between an output diode 12 and an input diode 10, which results in such incident light being reflected by the surface 40 to the input diode 10 in phase with all other light incident thereto.

Further in this regard, it is noted that the light focused by a grating 31 on a detecting diode 10 is further increased when the width of the grating element 32 is made approximately equal to the spacing therebetween. In essence, such a configuration, acting in conjunction with the reflecting surface 40, transfers the light energy from even order diffraction light lobes to the desired input photo-detecting diode 10.

It is observed at this point that the four segments of the grating 31 are shown in FIG. 3 as being somewhat removed from the coordinate axis intersection shown thereon, which intersection corresponds to the projection on the grating 31 of the associated output diode 12. This transparency in the center of the grating 31 is operative to prevent light from being spuriously transmitted by a virtual image, lying behind the grating 31 opposite to the subject-receiving photo-diode 10, to another input diode 10 symmetrically displaced from the emitting electro-luminescent diode 12 with respect to the intended receiving diode 10.

It is to be understood that the above described arrangement is only illustrative of the application of the principles of the present invention. Numerous other arrangements may be devised by those skilled in the art without departing from the spirit and scope thereof. For example, the gratings 31 and plane 30, and the reflecting surface 40 could all be fabricated from a single block of material by the well known photo resist technique, with a reflecting material being plated or evaporated over the etched surface.

Alternatively, the reflecting diffraction gratings 31 may be replaced by equivalent transmissive diffraction gratings, with the photo-detecting diodes 10 being mounted on a black body plane behind the grating plane.

What is claimed is:

1. A logic arrangement comprising a first logic stage including at least one optical reflecting grating means, a photo-detecting diode, electro-luminescent diode means for selectively illuminating said grating means and current source means connected to said detecting diode and to said electro-luminescent diode means.

2. A combination as in claim 1 further including a black body wall, with said photo-detecting diode and said electro-luminescent diode means being mounted on said wall.

3. A combination as in claim 2 further comprising a grating plane positioned in a parallel relationship with said black body wall, wherein said reflecting grating means is mounted on said grating plane.

4. A combination as in claim 3 further comprising a voltage source connected to said photo-detecting diode.

5. A combination as in claim 4, wherein said electro-luminescent diode is characterized by an output wavelength $\lambda$, and further comprising a reflecting surface plane a distance $\lambda/4$ on the side of said grating plane removed from said black body wall.

6. A combination as in claim 5 further comprising additional logic stages including at least one optical reflecting grating means, a photo-detecting diode, and electro-luminescent diode means for selectively illuminating said grating means, with the reflecting grating means included in said additional stages being mounted on the grating plane, and said photo-detecting diodes and said electro-luminescent diode means included in said additional stages being mounted on said black body wall.

7. A combination as in claim 6 further comprising an additional plurality of electro-luminescent diode means mounted on said back body wall, and Boolean variable input source means connected to said additional diode means.

8. A combination as in claim 7 wherein said electro-luminescent diode means are made of a gallium arsenide composition.

9. A combination as in claim 8 wherein said current source comprises an additional potential source and a resistor serially connected thereto.

10. In combination, a photo-detecting diode, an electro-luminescent diode, and a current source connected to each of said diodes.

11. A combination as in claim 10 further comprising means responsive to said photo-detecting diode being rendered conductive for inhibiting conduction through said electro-luminescent diode.

12. A combination as in claim 11 wherein said responsive means comprises a voltage source connected to said photo-detecting diode.

13. A combination as in claim 12 further comprising light propagating means for translating light beams generated by said electro-luminescent diode.

14. A combination as in claim 13 wherein said propagating means comprises a diffraction grating.

15. A combination as in claim 14 wherein said diffraction grating comprises a reflecting grating.

16. In combination, a reflecting grating including a plurality of reflecting elements, a light source characterized by a wavelength $\lambda$, light detecting means, said reflecting elements being curved such that the distances from said source to all points on any of said reflective elements to said light detecting means is a constant, and wherein the total distance from said source to each of said grating elements to said detecting means differs by $n\lambda$, where $n$ is any positive integer.

17. A combination as in claim 16 further comprising a reflecting surface placed a distance $\lambda/4$ from said grating.

18. In combination, a reflecting grating comprising a transparent portion and a plurality of reflecting surfaces, and a reflecting surface in a parallel relationship with said grating.

19. A combination as in claim 18 further comprising a light source of characteristic wavelength $\lambda$ directed at said grating, and wherein the distance between said grating and said reflecting surface is $\lambda/4$.

20. In combination, a plurality of logic stages including light emitting means, and optical grating means for optically interconnecting said stages.

21. A combination as in claim 20 wherein said grating means comprises reflecting grating means.

References Cited

UNITED STATES PATENTS

| | | | |
|---|---|---|---|
| 2,885,564 | 5/1959 | Marshall | 307—311 X |
| 2,952,792 | 9/1960 | Yhap | 307—311 X |
| 3,270,187 | 8/1966 | Fomenko | 250—208 X |

OTHER REFERENCES

"Proposed Optoelectronic Method of Achieving Very Fast Digital Logic," by E. H. Cooke-Yarborough, Proceedings of I.E.E., October 1964, vol. 111, No. 10, pp. 1641–1652.

JAMES W. LAWRENCE, *Primary Examiner.*

C. R. CAMPBELL, *Assistant Examiner.*